United States Patent [19]
Bird

[11] Patent Number: 5,810,676
[45] Date of Patent: *Sep. 22, 1998

[54] LIGHTWEIGHT SHAFT

[75] Inventor: Gregory M. Bird, Collierville, Tenn.

[73] Assignee: Emhart Inc., Newark, Del.

[*] Notice: The term of this patent shall not extend beyond the expiration date of Pat. No. 5,743,811.

[21] Appl. No.: 888,046

[22] Filed: Jul. 3, 1997

Related U.S. Application Data

[63] Continuation of Ser. No. 612,028, Mar. 7, 1996, Pat. No. 5,743,811.

[51] Int. Cl.⁶ .......................... A63B 53/10; A63B 53/12
[52] U.S. Cl. .................... 473/319; 473/320; 473/321; 273/DIG. 7; 273/DIG. 23
[58] Field of Search ...................... 473/316–323, 473/520, 521, 564; 43/18.1; 280/819; 428/36.5

[56] References Cited

U.S. PATENT DOCUMENTS

| | | | |
|---|---|---|---|
| 4,188,032 | 2/1980 | Yanagioka | 473/320 |
| 5,160,769 | 11/1992 | Garrett | 428/36.5 |
| 5,277,423 | 1/1994 | Artus | 473/319 |
| 5,294,119 | 3/1994 | Vincent | 473/318 |
| 5,511,777 | 4/1996 | McNeely | 473/520 |
| 5,545,094 | 8/1996 | Hsu | 473/317 |
| 5,593,158 | 1/1997 | Filice | 473/520 |
| 5,655,975 | 8/1997 | Nashif | 473/316 |

*Primary Examiner*—Sebastiano Passaniti
*Assistant Examiner*—Stephen L. Blau
*Attorney, Agent, or Firm*—E. D. Murphy

[57] ABSTRACT

A lightweight shaft 22 of generally tubular configuration, for with a golf club 20, is formed with a first layer 34 of a non-metallic composite material of a given density including graphite fibers 86 and cured epoxy resin 86. A second layer 38 of the shaft 22 is composed of a two foam half-forms 124, or a foam full-form 142, having a density which is lower than the given density and which are located around at least a portion of the length of the first layer 34. A third layer 40 of the shaft 22 is also composed of a non-metallic composite material including graphite fibers 86 and cured epoxy resin 86 which is located around the second layer 38 of the shaft 22. A portion of the third layer 38 is also located about the first layer 34 at a tip end 30 of the shaft 22.

15 Claims, 7 Drawing Sheets

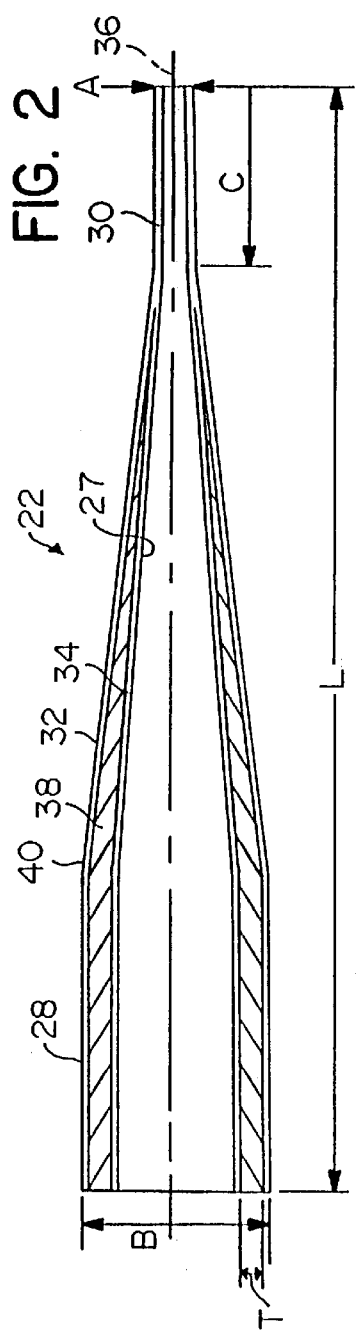
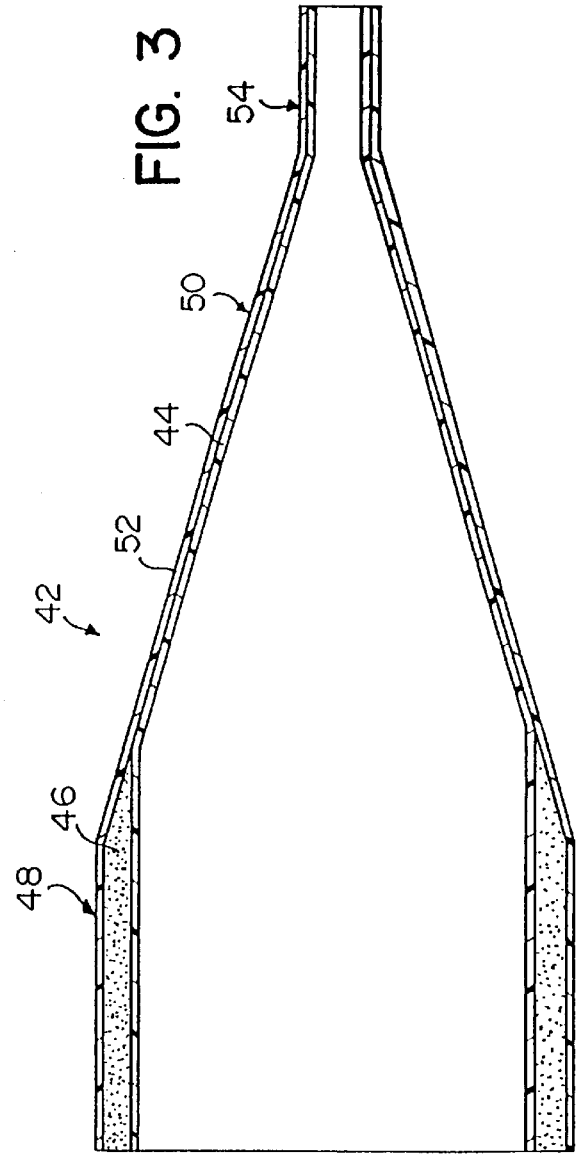

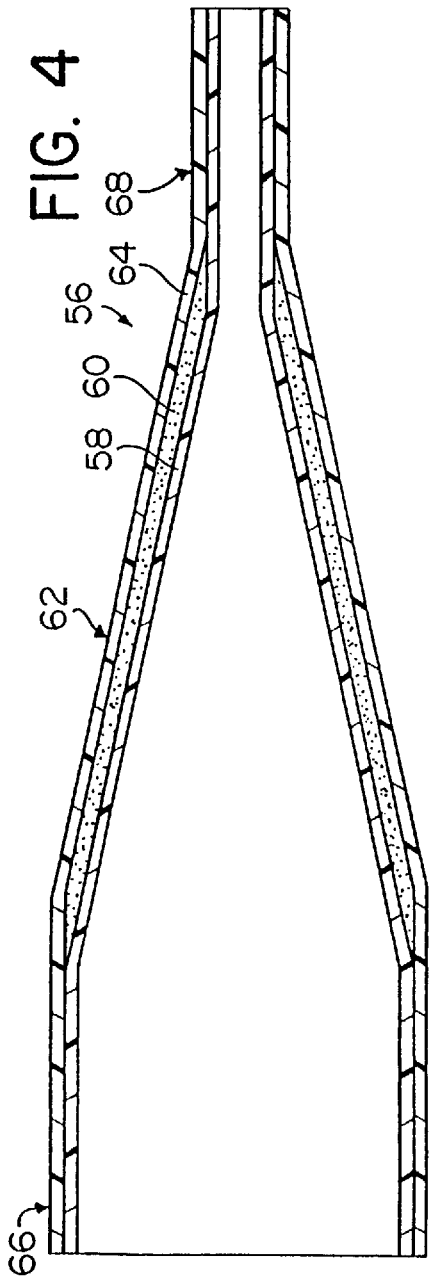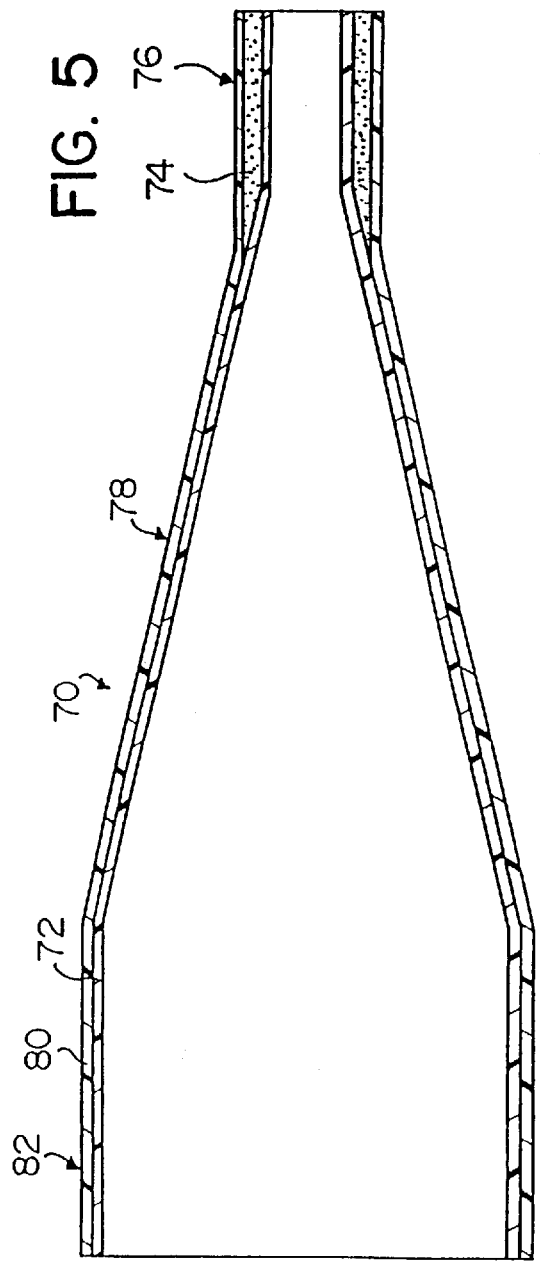

LIGHTWEIGHT SHAFT

This is a continuation of application Ser. No. 08/612,028, filed 7 Mar. 1996, U.S. Pat. No. 5,743,811.

BACKGROUND OF THE INVENTION

This invention relates to a lightweight shaft and particularly to a lightweight shaft which forms a portion of a golf club.

Golf clubs typically include a club head secured to a tip end of a club shaft and a hand grip assembled at a butt end of the shaft. The butt end of the shaft is formed with a diameter which is larger than the diameter of the tip end. The portion of the shaft which extends between the butt end and the tip end thereof is usually tapered from the larger diameter at the butt end to the smaller diameter of the tip end. The butt end and the tip end of the shaft could also be tapered or straight with a uniform diameter as noted above.

In playing the game of golf, a golfer swings the club and aims the head thereof toward a golf ball which is located, for example, on a ground level surface. Ideally, when the club head strikes the ball, the ball is directed in a long trajectory toward, and on line with, an associated hole-like cup located on a fine grass surface.

Many years ago, shafts for golf clubs were made from wood such as, for example, hickory which was suitable for the bending and twisting to which the club was subjected when swung by the golfer. However, the use of wood for the shafts influenced the manner in which the golfer had to swing the club. Later, clubs with metal shafts, such as steel shafts, were developed and evolved into a highly successful product which enhanced the golfers playing of the game. In recent years, clubs with non-metallic shafts have been developed and provide a viable and popular option to the use of the metal shafts. The non-metallic shafts are typically made from a fiber reinforced polymer matrix composite such as, for example, graphite fiber and an epoxy matrix.

There are several factors which are considered when designing a golf club to enhance the playing of the game. Perhaps the most important factor is the weight of the shaft. One of the parameters which is considered in the use of a golf club is the "swing weight" of the club. The swing weight parameter represents generally the weight of the club as it is being swung and is related to the overall weight and the weight distribution in the club. Clubs are classified in several principal grades, and several sub grades within each principal grade, based on the swing weight of the clubs. The clubs with a low swing weight are typically used by the weaker hitters while the higher swing-weight clubs are used by the stronger hitters.

The development of the composite shaft resulted in a shaft which is lighter in weight than the steel shaft and thereby presented a weight enhancement, particularly for the weaker hitters who use the low swing-weight clubs.

When the composite shaft was developed, it provided an option for some golfers to switch from a club with the heavier metal shaft to a club with the lighter composite shaft if the golfer experienced improved play with the lighter club. Also, with the lighter composite club, the weight of the club head could be increased slightly whereby the speed of the head is increased which translates into increases in ball speed and distance thereby further enhancing the golfers playing of the game.

With the realization and recognition that the above-noted advantages can be attained by using the lighter composite clubs, there is a need to develop even lighter clubs to provide further enhancement of the playing of the game by golfers.

SUMMARY OF THE INVENTION

It is, therefore, an object of this invention to provide a lightweight shaft.

Another object is to provide a lightweight shaft for use as a component of a golf club to enhance the feel and playability of the club.

A further object of this invention is to provide a lightweight shaft which can be used to form a component of any type of golf club such as woods, irons, wedges or putters.

Still another object of this invention is to provide a low cost composite shaft for use as a lightweight component of a golf club.

With these and other objects in mind, this invention contemplates a lightweight shaft which includes a first layer of a material of a given density, a second layer of a material of a density lower than the given density and in engagement with at lease a portion of the first layer, and a third layer of a material of a density greater than the density of the second-layer material and in engagement with at least a portion of the second layer.

This invention further contemplates a method of making a lightweight shaft which includes the steps of forming a first layer of a first material of a given density in a generally tubular configuration, placing a second layer of a second material having a density lower than the given density over at least portions of the first layer, and forming a third layer of a third material having a density greater than the density of the first layer over at least portions of the second layer.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 2 is a sectional view taken along line 2—2 of the shaft of FIG. 1 showing a preferred embodiment of the shaft in accordance with certain principles of the invention, portions of which are shown disproportionately enlarged for illustration purposes only;

FIG. 3 is a sectional view showing a second embodiment of the shaft of FIG. 1 in accordance with certain principles of the invention, portions of which are shown disproportionately enlarged for illustration purposes only;

FIG. 4 is a sectional view showing a third embodiment of the shaft of FIG. 1 in accordance with certain principles of the invention, portions of which are shown disproportionately enlarged for illustration purposes only;

FIG. 5 is a sectional view of a fourth embodiment of the shaft of FIG. 1 in accordance with certain principles of the invention, portions of which are shown disproportionately enlarged for illustrations purposes only;

DESCRIPTION OF THE PREFERRED EMBODIMENTS

Figure 1:
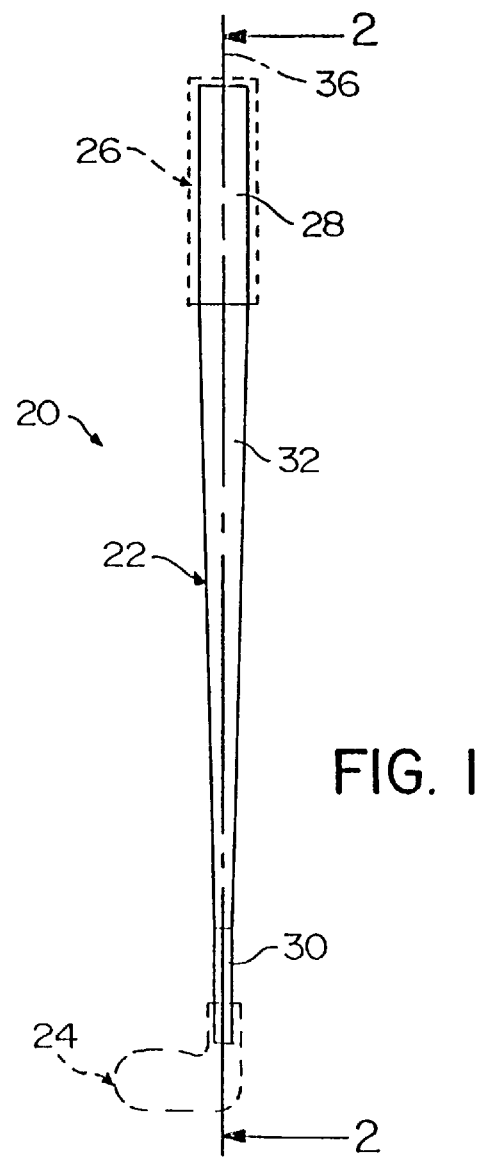
FIG. 1 is a side view of a golf club having a club head and a grip each assembled with a shaft.

Referring to FIG. 1, a golf club 20 is formed by a shaft 22, a club head 24, shown in phantom, and a grip 26, also shown in phantom. The shaft 22, which is generally tubular with an axial opening 27 (FIG. 2), is formed with a butt end 28 to which the grip 26 is attached and is also formed with a tip end 30 to which the head 24 is secured. An intermediate section 32 of the shaft 22 extends between the butt end 28 and the tip end 30 thereof and tapers inwardly from an inboard extremity of the butt end to an inboard extremity of the tip end. The butt end 28 and the tip end 30 each could be of a uniform diameter, or either or both of the butt and tip ends could be tapered or the entire shaft 22 could be tapered from one extremity to the other, all without departing from the spirit and scope of the invention.

As shown in FIG. 2, the shaft 22 of the preferred embodiment is formed by a first layer or skin 34 which forms an inner layer of the shaft, the inner wall of which forms the axial opening 27. The layer 34, which has a given density, is composed of a composite material such as graphite fibers 86 (FIG. 6) and an epoxy resin matrix 88 (FIG. 6) as described hereinbelow. The fibers of the composite material also could be fiberglass, aramid, boron or other suitable fiber materials, and the epoxy resin matrix could be polyester, vinylester, nylon or any other suitable thermoset or thermoplastic matrix, all without departing from the spirit and scope of the invention. The fibers 86 are typically in a parallel, spaced array within the epoxy resin 88 and are arranged in the formation of the shaft 22 so that the fibers are parallel with, and/or on a bias with respect to, an axis 36 of the shaft.

The shaft 22 is further formed by a second layer or core 38 of a low density foam material. The foam material used in the preferred embodiment to form the second layer 38 is available commercially under the trademark "ROHASELL" from Richmond Aircraft Products of Norwalk, Calif., and is manufactured by Rohm Gmbh of Darmstadt, Germany. The foam material of the second layer 38 has a density much lower than the given density of the first layer 34. Other suitable foam materials and low density materials could be used to form the second layer 38 without departing from the spirit and scope of the invention.

The shaft 22 is also formed with a third layer or skin 40 which forms an outer layer of the shaft. In the preferred embodiment, the third layer 40 is composed of the same composite material as the first layer 34 and is arranged so that the fibers thereof are parallel and/or on a bias with the axis 36 of the shaft 22.

As further illustrated in FIG. 2, the preferred embodiment of the shaft 22 is in a laminated configuration from the outboard extremity of the butt end 28 to a location generally at the inboard end of the tip end 30 and includes the first or inner layer 34, the second or core layer 38 and the third or outer layer 40. The remaining portion of the shaft 22, which is generally defined by the tip end, is formed by a lamination of the first layer 34 and the third layer 40. The portion of the second layer 38, which is located in the butt end 28 of the shaft 22, is generally of a uniform diameter. The remaining portion of the second layer 38 decreases in thickness toward the tip end 30 and along the intermediate section 32.

A second embodiment of the invention is shown in FIG. 3 in the form of a shaft 42. Shaft 42 is formed by a first or inner layer 44 in the same manner, and is composed of the same composite material, as the first layer 34 of the shaft 22. The shaft 42 is formed with a second layer or core 46 in a butt end 48 of the shaft. The second layer 46 is composed of the same low density foam material as the second layer 38 of the shaft 22 (FIG. 2). A third or outer layer 52 of the shaft 42 is composed of the same composite material as the first layer 44 thereof and overlays the second layer 46 generally in the butt end 48 and blends with the first layer generally along an intermediate section 50 and at a tip end 54 of the shaft.

As shown in FIG. 4, a third embodiment of the invention includes a shaft 56 having a first or inner layer 58 formed in the same manner, and composed of the same composite material, as the first layer 34 of the shaft 22. A second layer or core 60 of the shaft 56 is formed by a low density foam material, which is the same as the foam material of the shaft 22, and is located over the first layer 58 generally along an intermediate section 62 of the shaft 56. A third or outer layer 64 of the shaft 56, of the same composite material as the third layer 52 of the shaft 42, is in engagement with the first layer 58 at a butt end 66, with the second layer 60 of the foam material along the intermediate section 62 and with the first layer 58 along a tip end 68 of the shaft 56.

Referring to FIG. 5, a shaft 70 illustrates a fourth embodiment of the invention and includes a first or inner layer 72 formed in the same manner, and composed of the same composite material, as the first layer 34 of the shaft 22. A second layer or core 74 of the shaft 70 is composed of the same low density foam material as the second layer 38 of the shaft 22. The second layer 74 is located at a tip end 76 of the shaft 70 and extends from the outboard extremity of the tip end to a juncture of the tip end with an intermediate section 78 of the shaft. A third or outer layer 80 of the shaft 70, which is composed of the same composite material as the first layer 72 of the shaft, is in engagement with the second layer 74 at the tip end 76 of the shaft and is in engagement with the first layer 72 along the intermediate section 78 and a butt end 82.

In general, each of the first and third layers of the above-described shafts 22, 42, 56 and 70 may be formed by several uncured layers of the composite material which blend together when heated and cured to form, respectively, the first and third layers without departing from the spirit and scope of the invention.

Each of the above-described shafts 22, 42, 56 and 70 may be used for any type of golf clubs including woods, irons, wedges and putters. The above-described structure of these shafts allows for the increased stiffness of a sandwich or laminated configuration which decreases the requirements of a thick wall section in comparison with a conventionally designed golf shaft. The design of each of these above-described shafts separates a single load carrying member, such as an all-composite-material shaft typically found in a conventional shaft, into two thinner walls formed by the above-described first and third layers of the composite material. The foam layer or core, represented by the above-described second layers, is sandwiched between the two thinner walls in each of the above-described embodiments. This allows for a much stiffer and stronger structure with the same mass of wall material when compared with the conventional all-composite-material shaft. Taking this into consideration, the wall mass may be reduced to obtain a shaft stiffness consistent with the stiffness of the conventional all-composite-material shaft and thereby reduce the overall weight of the shafts of each of the above-described embodiments. A shaft embodying the above-described inventive structures also produces greater feel and response to the golfer who uses a club which includes the shaft.

While the preferred embodiment, and the second, third and fourth embodiments are formed by first and third layers of the composite material as described, the first and/or third layers may also be composed of suitable metals such as, but not limited to, aluminum, steel or titanium without departing from the spirit and scope of the invention.

The material which forms the second layer in each of the above-described shafts 22, 42, 56 and 70 must have sufficient compressive strength to transmit compressive loads from the outer or third layer to the inner or first layer. This will improve the overall stiffness and buckling strength of the inventive shafts. Also, while the four above-described embodiments of the inventive shafts 22, 42, 56 and 70 define particular locations of the foam material, the foam material could be placed at locations other than those described above without departing from the spirit and scope of the invention. For example, the foam layer could be located between the first and third layers along the entire length of the shaft. Or separate sections of the foam material could be located in spaced portions, but not all, of any one major section of the shaft (i.e., the butt end, the intermediate section or the tip end) or in any combination of two or three of the major sections of the shaft.

Figure 19:
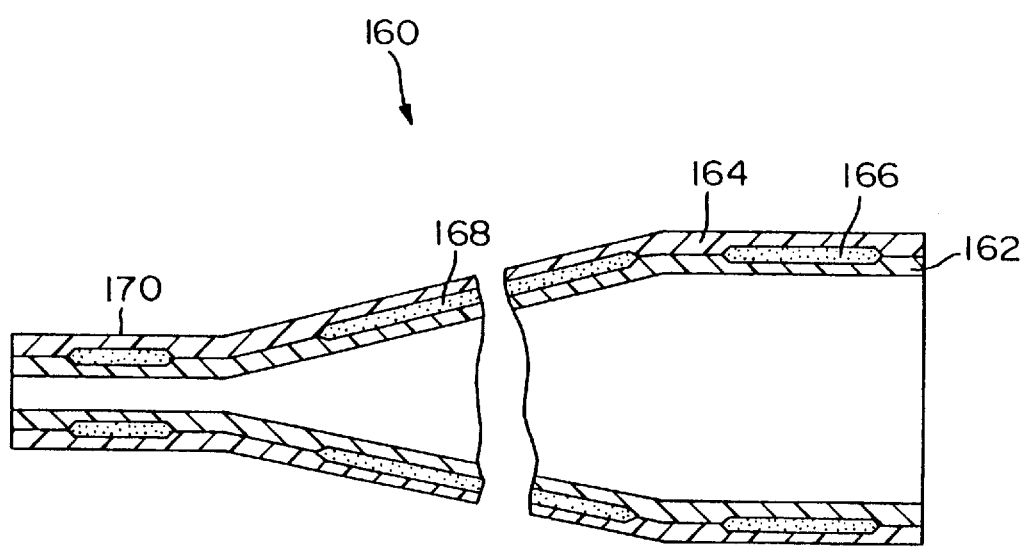
FIG. 19 is a sectional view showing a fifth embodiment of the shaft of FIG. 1 in accordance with certain principles of the invention, portions of which are shown enlarged for illustration purposes only.

As shown in FIG. 19, a shaft 160 represents variations of a fifth embodiment of the shaft and is composed of a first layer or skin 162 and a second layer of skin 164 in an interfacing engagement in the manner described above. Three separate foam layers 166, 168 and 170 are arranged along the axis of the shaft 160. As noted above, without departing from the spirit and scope of the invention, the shaft 160 could include only one of the three layers 166, 168 and 170, or could include any combination of two or three of the foam layers in the major sections of the shaft as illustrated.

While the wall mass of the inventive shafts 22, 42, 56, 70, and 160 is thinner than the conventional all-composite-material shaft, the inventive shafts are formed with a conventional outside dimension planform with the major thickness differences appearing within the laminated structure.

The following chart shows dimensions of the preferred embodiment of the invention which correlate to the dimension letters "A" "B" "C" "L" and "T" shown in FIG. 2.

| Dimension | Description | Woods | Irons |
| --- | --- | --- | --- |
| A | Tip Diameter | 0.335 in. | 0.370 in. |
| B | Butt Diameter | 0.600 in. | 0.600 in. |
| C | Foam End Point | 5.00 in. | 5.00 in. |
| L | Shaft length | 45.00 in. | 40.00 in. |
| T | Foam Thickness | 2 to 3 mm. | 2 to 3 mm. |

Other dimensions could be used without departing from the spirit and scope of the invention.

As noted above, several of the figures include portions which are shown disproportionately enlarged for illustration purposes. The dimensions of the chart above will provide representative dimensions for the shafts described herein.

Figure 6:
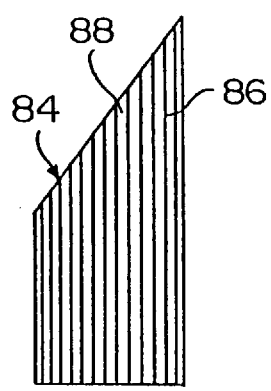
FIG. 6 is a front view showing a flag or sheet of a composite material used in the manufacture of a composite shaft.
Figure 7:
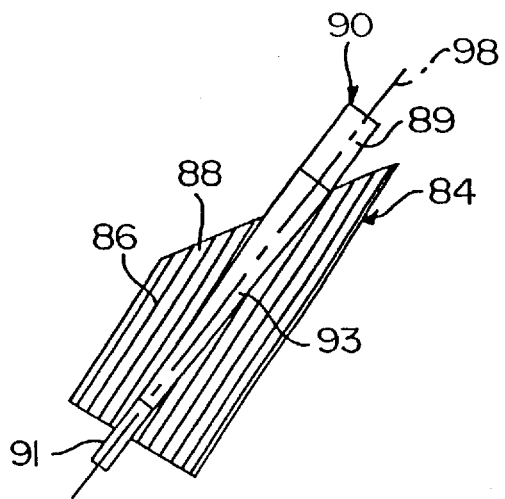
FIG. 7 is a front view showing a tapered mandrel positioned adjacent the flag of composite material of FIG. 6 in preparation for a flag-wrapping operation.

Referring to FIG. 6, in the preferred method of making the preferred embodiment of the invention, that is the shaft 22, a sheet 84 (one shown) of the composite material includes the graphite fibers 86 held and suspended in a parallel, spaced array by the uncured epoxy resin 88. It is to be understood that the fibers 86 could be arranged in a different parallel array or matrix other than the array illustrated in FIG. 6 without departing from the spirit and scope of the invention. Also, the illustrated configuration of the sheet 84 is representative of a configuration of such a sheet. Several different configurations of the sheet 84 could be used, depending on the desired configuration of the cured first layer 34. As shown in FIG. 7, a first of the composite sheets 84 is wrapped around a mandrel 90. The mandrel 90 is formed (1) with a butt end 89 of uniform diameter along a given length thereof, (2) with a tip end 91 for a given length of the shaft at a uniform diameter smaller than the uniform diameter of the butt end, and (3) with a tapered intermediate section 93 extending between inboard extremities of the butt and tip ends. The mandrel 90 is typically formed from a metal such as, for example, steel but could be formed from any other suitable metal or non-metal material without departing from the spirit and scope of the invention. The sheet 84 could be wrapped around the mandrel 90 in such a manner that the fibers 86 are parallel, and/or on a bias, with an axis 98 of the mandrel.

As noted above, if desired, several uncured sheets 84 could be wrapped around the mandrel 90 to form the first layer of any of the shafts 22, 42, 56 and 70 to obtain a desired thickness and/or fiber orientation of the first layer without departing from the spirit and scope of the invention.

Figure 8:
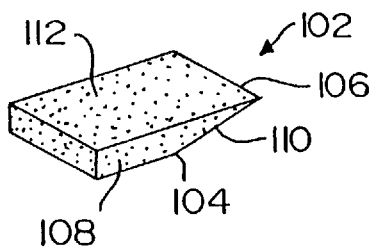
FIG. 8 is a perspective view showing a sheet of foam material having a feathered section in accordance with certain principles of the invention.
Figure 9:
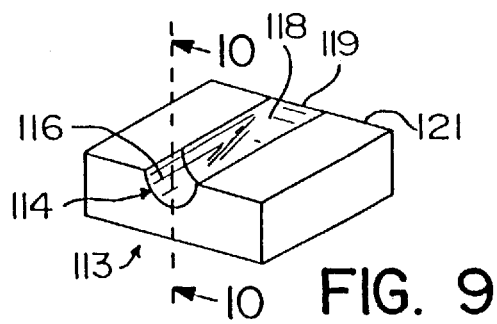
FIG. 9 is a perspective view showing a mold section and cavity for use in forming the sheet of FIG. 8 in accordance with certain principles of the invention.
Figure 10:
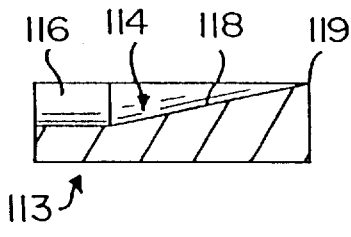
FIG. 10 is sectional view taken along line 10—10 of FIG. 9 showing structure of the mold section of FIG. 9.
Figure 11:
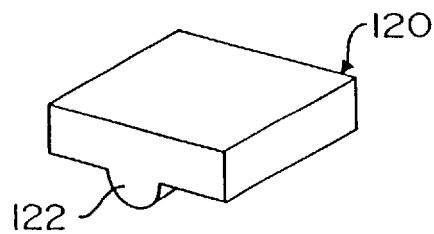
Fig. 11 is a perspective of a mold section which mates with the mold section of FIG. 9 in accordance with certain principles of the invention.
Figure 12:
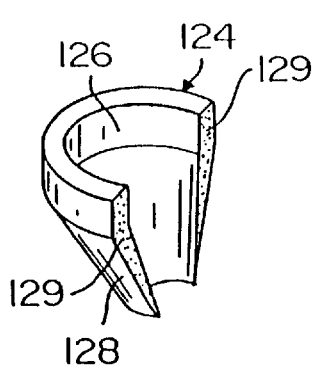
FIG. 12 is a perspective view showing a foam material form which forms a part of the shaft of FIG. 1 in accordance with certain principles of the invention.

Thereafter, the foam layer such as, for example, the second layer or core 38 of the shaft 22, is to be prepared for assembly about the first layer 34. Referring to FIG. 8, the preferred technique for preparing the second or foam layer 38 involves the step of feathering a sheet 102 of the above-noted foam material from an intermediate portion 104 to an edge 106 thereof to form a section 108 of uniform thickness and a section 110 of varying thickness. Thereafter, a major flat surface 112 of the feathered sheet 102 is placed on a mold section 113 (FIGS. 9 and 10) having a cavity 114 formed therein so that the sheet covers the cavity. The cavity 114 is formed with a cylindrical section 116 at one end thereof and a concave section 118 extending from an inboard end of the cylindrical section to an opposite end 119 of the cavity which is in line (FIG. 9) with an edge 121 of the mold section 113 and which tapers outward from the inboard end to the opposite end. As shown in FIG. 11, another mold section 120, having a forming section 122 in a configuration complementary to the configuration of the cavity 114, is assembled with the mold section 113 so that the foam sheet 84 is captured between the cavity and the forming section. Thereafter, the mold sections 113 and 120 are heated so that the foam sheet 84 assumes the shape illustrated in FIG. 12 as a foam half-form 124 having a cylindrical section 126 of uniform thickness, an inward tapered section 128 of decreasing thickness from its juncture with the cylindrical section to the opposite end thereof and a pair of spaced mating surfaces 129 which are in the same plane.

Figure 13:
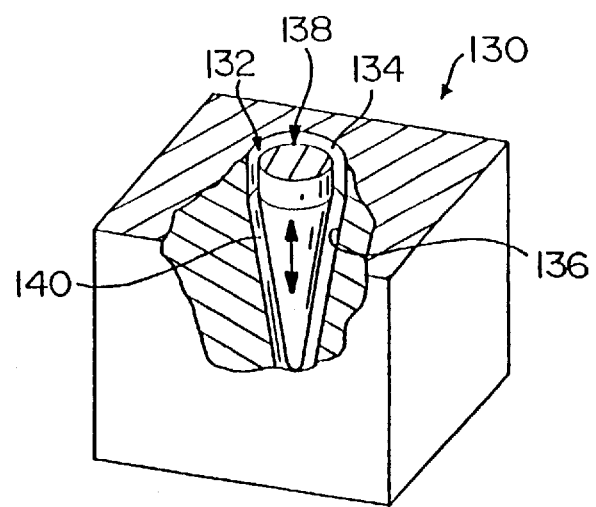
FIG. 13 is a perspective view with portions broken away showing a mold for forming a foam form in accordance with certain principles of the invention.
Figure 14:
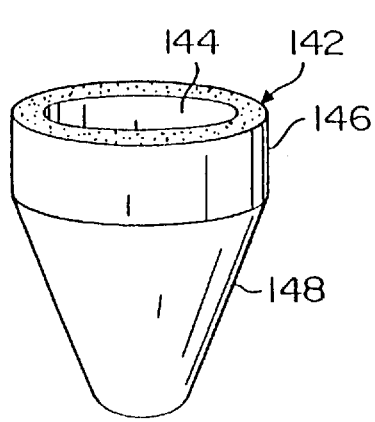
FIG. 14 is a perspective view showing the foam form formed by use of the mold of FIG. 13.

In another technique for making the second or core layer 38, and referring to FIG. 13, a mold 130 is formed with a cavity 132 which includes a cylindrical section 134 and an inward tapered, cone-like section 136. A cavity insert 138, which has an outer configuration which is complementary to the configuration of the cavity 132, is moved into the cavity to form a cavity space 140 between the cavity and the insert. A foam material in a liquid form is poured into the cavity space 140 and the mold 130 is heated and cooled to cure the foam in the configuration of the cavity space 140. The cavity insert 138 with the formed foam is retracted from the mold 130 to reveal a foam full-form 142, as illustrated in FIG. 14, which is removed from the insert. The full-form 142 is formed with an axial opening 144 which extends through the full-form an includes a cylindrical section 146 of uniform diameter and an inward tapered section 148 of varying thickness. If the full-form 142 were cut in half vertically through the centerline, each of the two halves formed thereby would appear essentially as the half-form 124 of FIG. 12. An example of a fluid foam material which can be used for this process is a phenolic foam commercially available under the trademark "THERMO-COR2" from American Foam Technologies of Ronceverte, W. Va.

Figure 15:
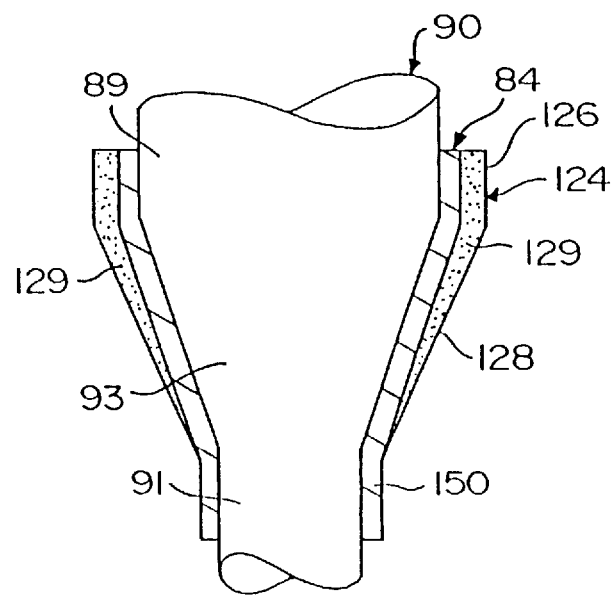
FIG. 15 is a sectional view, portions of which are shown disproportionately enlarged for illustration purposes only, showing a first layer of a composite material and a second layer of the foam form of FIG. 12 in assembly with a mandrel in accordance with certain principles of the invention.

If the technique involving the half-form 124 is used, two of the half-forms are positioned around the sheets 84 which are wrapped on the mandrel 90, as shown in FIG. 15, with the mating surfaces 129 of the two half-forms being in abutting engagement. The two half-forms 124 are retained in this assembly by use of a small strip of adhesive tape (not shown) or by applying a small amount of glue to the abutting surfaces 129 of the two half-forms.

If the technique involving the full-form 142 is used, a single full-form is assembled axially over the mandrel 90 and the sheets 84 wrapped around the mandrel to encompass the wrapped sheets in a manner similar to sectional illustration of FIG. 15.

Figure 16:
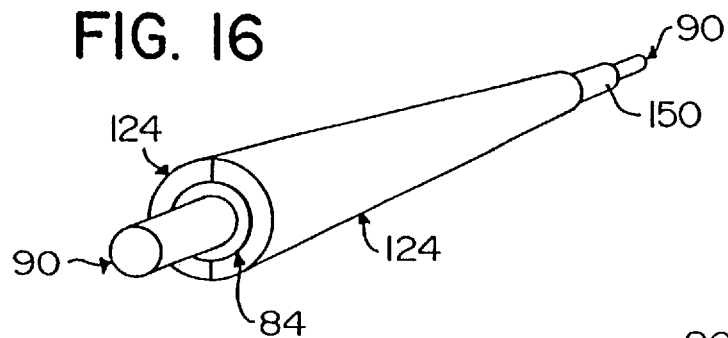
FIG. 16 is a perspective view showing the assembly of FIG. 15.

In either of the above-described techniques, a portion 150 of the wrapped sheets 84 of the first layer 34, which is adjacent to the tip end 91 of the mandrel 90, will not be covered by the half-form 124 or the full-form 142 as shown in FIGS. 15 and 16.

Figure 17:
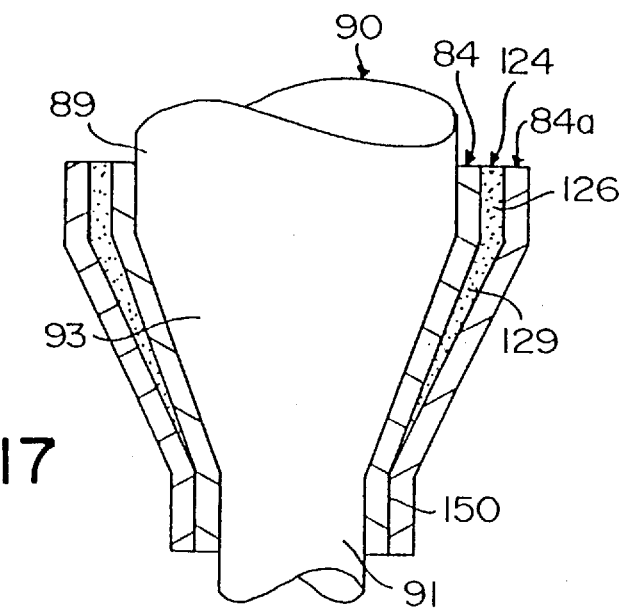
FIG. 17 is a sectional view showing an assembly which includes two layers of a composite material with a foam layer disposed between the two layers all of which are mounted on a mandrel in accordance with certain principles of the invention.
Figure 18:
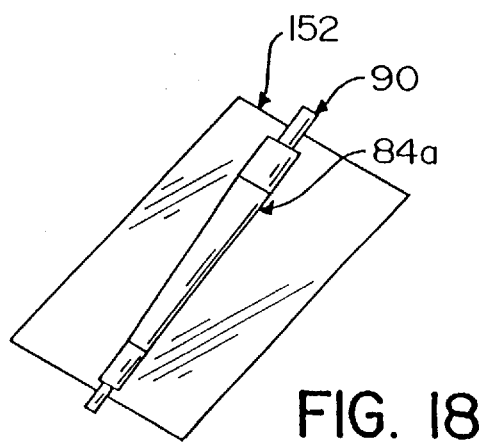
FIG. 18 is a plan view, portions of which are shown disproportionately enlarged for illustration purposes only, showing the assembly of FIG. 17 in position to be wrapped with a heat-shrinkable film

Thereafter, as shown in FIG. 17, a second one, or several if desired, of the sheets of the composite material, which is designated by the numeral "84a" to distinguish from the first-layer sheets 84, is wrapped around the half-forms 124, or full-forms 142, and the exposed portion 150 of the first wrapped sheets 84. As shown in FIG. 18, a heat-shrinkable film 152 is positioned to be, and is eventually, placed over the third wrapped sheet or sheets 84a. The assembly of the mandrel 90, the sheets 84 and 84a, and the half-forms 124 or the full form 142 is then processed through an oven (not shown). While in the oven, the epoxy resin 88 of the wrapped sheets 84 and 84a is transformed into a fluid state and the film 152 shrinks to compress the fluid epoxy resin with the fibers 86 remaining in place. The film 152 shrinks generally to the shape defined by butt end 89, intermediate section 93 and the tip end 91 of the mandrel 90. The assembly of the mandrel 90, the sheets 84 and 84a and the shrinkable film 152 is then removed from the oven and the epoxy resin 88 is allowed to cure generally in the shape defined by the shrunken film and the mandrel. The film 152 is removed to reveal generally the shaft 22 as illustrated in FIG. 2. During the heating process, the epoxy resin 88 blends generally into an homogenous form on each side of the forms 124 or 142, and at the portions adjacent the tip end 91 of the mandrel 90, with the fibers 86 remaining in place. In addition, the portions of the composite sheets 84 and 84a which are in engagement with the forms 124 or 142 blend to some extent with the adjacent portions of the foam forms to enhance the unitized formation of the sheets with the foam forms. However, the interior portions of the half-forms 124 or the full-form 142 retain their structural integrity with respect to the foam material thereof. After the curing process has been completed, the shrunken film 152 is removed to reveal the shaft 22 mounted on the mandrel 90.

It is noted that, except for the portions of the above-described heating and curing process which relate to the foam half-form 124 and the full-form 142, the heating and curing process is similar to conventional processes for making composite shafts.

The mandrel 90 can be removed from assembly with the cured first, second and third layers 34, 38 and 40, respectively, of the shaft 22 whereafter the third layer can be further processed if necessary or desired, to provide a desired sizing and/or finish on the outer surface of the shaft 22.

Other techniques for making the shaft 22 may be used without departing from the spirit and scope of the invention. For example, an autoclave technique can be used wherein the sheets 84 and 84a of composite material are wrapped around the mandrel 90 and forms 124 or 142 to form an assembly in the manner described above. Thereafter, a small diaphragm bag (not shown) is placed over the assembly and cured in an autoclave (not shown) with an external pressure of up to 150 psi applied to the assembly. The assembly is then removed from the autoclave and the bag is removed to reveal the completed shaft 22.

The shaft 22 may also be made by using a pressure molding process. For example, a small diaphragm bag (not shown) is placed over the assembly of the mandrel 90, the composite sheets 84 and 84a, and the foam forms 124 or 142 which is processed and cured in a clamshell mold (not shown) with an internal pressure of up to 150 psi applied to the assembly. The cured product is removed from the mold and the bag to reveal the completed shaft 22 mounted on the mandrel 90.

In general, the above-identified embodiments are not to be construed as limiting the breadth of the present invention. Modifications, and other alternative constructions, will be apparent which are within the spirit and scope of the invention as defined in the appended claims.

What is claimed is:

1. A lightweight shaft of a generally tubular configuration and a prescribed length along an axis of the shaft, which comprises:

a first layer of a material of a given density extending axially for a distance equal to the prescribed length, a second layer of a foam material of a density lower than the given density and in engagement with at least a portion of the first layer, the second layer extending axially for a distance less than the prescribed length;

a third layer of a metallic material in engagement with at least a portion of the second layer;

the third layer extending axially for a distance equal to the prescribed length and having at least a portion thereof in engagement with a portion of the first layer;

the shaft being formed axially with a butt end and a tip end at the axial extremities thereof and an intermediate section between the butt end and the tip end; and the second layer being located in at least one of the butt end, the intermediate section and the tip end.

2. The lightweight shaft as set forth in claim 1 wherein the first layer is composed of a non-metallic composite material.

3. The lightweight shaft as set forth in claim 2 wherein the composite material is formed by graphite fibers and an epoxy resin.

4. The lightweight shaft as set forth in claim 1 wherein the third layer is composed of a metallic material selected from the group of aluminum, steel and titanium.

5. The lightweight shaft as set forth in claim 1 wherein the second layer extends from an outboard extremity of the butt end to an inboard extremity of the tip end.

6. The lightweight shaft as set forth in claim 1 wherein the second layer is located at least within the butt end of the shaft.

7. The lightweight shaft as set forth in claim 1 wherein the second layer is located at least within the intermediate section of the shaft.

8. The lightweight shaft as set forth in claim 1 wherein the second layer is located at least within the tip end of the shaft.

9. The lightweight shaft as set forth in claim 1 wherein the second layer is tapered inward from an inboard extremity of the butt end to the inboard extremity of the tip end.

10. The lightweight shaft as set forth in claim 1 wherein the first layer and the third layer are in engagement to form the tip end of the shaft.

11. The lightweight shaft as set forth in claim 1 wherein the second layer is formed by at least two portions thereof which are separated and spaced from each other along the length of the shaft.

12. A lightweight shaft of a generally tubular configuration and a prescribed length along an axis of the shaft, which comprises:

a first layer of a metallic material extending axially for a distance equal to the prescribed length, a second layer of a foam material of a given density in engagement with at least a portion of the first layer, the second layer extending axially for a distance less than the prescribed length;

a third layer of a material of a density greater than the given density of the material in the second layer and in engagement with at least a portion of the second layer;

the third layer extending axially for a distance equal to the prescribed length and having at least a portion thereof in engagement with a portion of the first layer;

the shaft being formed axially with a butt end and a tip end at the axial extremities thereof and an intermediate section between the butt end and the tip end; and the second layer being located in at least one of the butt end, the intermediate section and the tip end.

13. A lightweight golf club, which comprises:

a shaft of a prescribed length along an axis of the shaft which includes:

a first layer of a material of a given density extending for a distance equal to the prescribed length;

a second layer of a foam material of a density lower than the given density and in engagement with at least a portion of the first layer;

the second layer extending for a distance less than the prescribed length;

a third layer of a metallic material in engagement with at least a portion of the second layer; and the third layer extending for a distance equal to the prescribed length and having at least portions thereof in engagement with portions of the first layer;

the shaft formed with a butt section at one end thereof, a tip section at an opposite end thereof and an intermediate section between the butt and tip sections;

a grip mounted on the butt section of the club;

a head mounted on the tip section of the club; and the second layer being located in at least one of the butt, intermediate and tip sections.

14. The lightweight golf club as set forth in claim 13, wherein the first layer of material of the shaft is a metallic material.

15. The lightweight golf club as set forth in claim 13, wherein the first layer of material of the shaft is a metallic material and the third layer of material is a non-metallic material of a density greater than the given density.

* * * * *